United States Patent
Chen et al.

(10) Patent No.: US 9,740,356 B1
(45) Date of Patent: Aug. 22, 2017

(54) CAPACITIVE TOUCH SYSTEM USING DIFFERENTIAL SENSING AND OPERATING METHOD THEREOF

(71) Applicant: PIXART IMAGING INC., Hsin-Chu County (TW)

(72) Inventors: Hsin-Chia Chen, Santa Clara, CA (US); Kenneth Crandall, Santa Clara, CA (US); Thomas Patrick Murphy, Santa Clara, CA (US)

(73) Assignee: PixArt Imaging Inc., Hsin-Chu County (TW)

( * ) Notice: Subject to any disclaimer, the term of this patent is extended or adjusted under 35 U.S.C. 154(b) by 15 days.

(21) Appl. No.: 15/016,484

(22) Filed: Feb. 5, 2016

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ................................ G06F 3/044; G06F 3/0416
See application file for complete search history.

(56) References Cited

U.S. PATENT DOCUMENTS

| | | | | |
|---|---|---|---|---|
| 9,389,742 | B2* | 7/2016 | Crandall | G06F 3/044 |
| 2010/0060591 | A1* | 3/2010 | Yousefpor | G06F 3/044 345/173 |
| 2012/0056841 | A1* | 3/2012 | Krenik | G06F 3/044 345/174 |
| 2014/0071082 | A1* | 3/2014 | Singh | G06F 3/044 345/174 |
| 2014/0204053 | A1* | 7/2014 | Crandall | G06F 3/0418 345/174 |
| 2015/0002463 | A1* | 1/2015 | Kanazawa | G06F 3/044 345/174 |
| 2016/0062494 | A1* | 3/2016 | Zuber | G06F 3/0418 345/173 |

\* cited by examiner

*Primary Examiner* — Ariel Balaoing
(74) *Attorney, Agent, or Firm* — Hauptman Ham, LLP

(57) ABSTRACT

A capacitive touch system including a drive end, a capacitive sensing matrix and a detection end is provided. The drive end concurrently inputs encoded and modulated drive signals into a plurality of channels of the capacitive sensing matrix within each drive time slot of a frame. The detection end detects a detection matrix of the channels in the frame and decodes the detection matrix to respectively generate a two-dimensional detection vector corresponding to each of the channels. The detection end further calculates a subtraction between components of the two-dimensional detection vectors associated with two receiving electrodes of the capacitive sensing matrix to eliminate interference from noises.

20 Claims, 7 Drawing Sheets

| | | | drive signals |
|---|---|---|---|
| k=n | k=2 | k=1 | |
| X(t)a$_{n1}$x$_1$ | X(t)a$_{21}$x$_1$ | X(t)a$_{11}$x$_1$ | X$_1$(t$_k$) |
| X(t)a$_{n2}$x$_2$ | X(t)a$_{22}$x$_2$ | X(t)a$_{12}$x$_2$ | X$_2$(t$_k$) |
| . | . | . | . |
| . | ..... | . | . |
| . | . | . | . |
| X(t)a$_{nn}$x$_n$ | X(t)a$_{2n}$x$_n$ | X(t)a$_{1n}$x$_n$ | X$_n$(t$_k$) |

CAPACITIVE TOUCH SYSTEM USING DIFFERENTIAL SENSING AND OPERATING METHOD THEREOF

BACKGROUND

1. Field of the Disclosure

This disclosure generally relates to a touch system and, more particularly, to a capacitive touch system using differential sensing and an operating method thereof.

2. Description of the Related Art

Capacitive sensors generally include a pair of electrodes configured to sense a conductor. When the conductor is present, the amount of charge transfer between the pair of electrodes can be changed so that it is able to detect whether the conductor is present or not according to a voltage variation. It is able to form a sensing matrix by arranging a plurality of electrode pairs in a matrix.

FIGS. 1A and 1B are schematic diagrams of a conventional capacitive sensor which includes a first electrode 91, a second electrode 92, a drive circuit 93 and a detection circuit 94. The drive circuit 93 is configured to input a drive signal X to the first electrode 91. Electric field can be generated between the first electrode 91 and the second electrode 92 so as to transfer charges to the second electrode 92. The detection circuit 94 is configured to detect the amount of charge transfer Y to the second electrode 92.

When a conductor is present, e.g. shown by an equivalent circuit 8, the conductor can disturb the electric field between the first electrode 91 and the second electrode 92 so that the amount of charge transfer Y' is reduced. The detection circuit 94 can detect a voltage variation to accordingly identify the presence of the conductor.

As the capacitive sensor is generally applied to various electronic devices, e.g. liquid crystal display (LCD), the voltage variation detected by the detection circuit 94 can be interfered by the noise of the electronic devices to degrade the detection accuracy.

Accordingly, it is necessary to provide a way to solve the above problem.

SUMMARY

The present disclosure provides a capacitive touch system and an operating method thereof that perform the differential operation between digital components of detection matrices of different receiving electrodes so as to reduce the noise interference.

The present disclosure provides a capacitive touch system including a drive circuit, a capacitive sensing matrix, an encoding module, a modulation module, a detection circuit, a decoding module, a first subtraction circuit and a second subtraction circuit. The drive circuit is configured to output a drive signal. The capacitive sensing matrix includes a plurality of sensing elements arranged in rows and columns. The encoding module is configured to encode the drive signal corresponding to each row of the sensing elements to output encoded drive signals. The modulation module is configured to modulate the encoded drive signals corresponding to each row of the sensing elements to concurrently output encoded and modulated drive signals to each row of the sensing elements. The detection circuit is coupled to the capacitive sensing matrix and configured to respectively generate a detection matrix according to a detection signal of each column of the sensing elements. The decoding module is configured to decode the detection matrices to output a two-dimensional detection vector corresponding to each of the sensing elements. The first subtraction circuit is configured to subtract a first digital component of the two-dimensional detection vector of a second sensing element among the plurality of sensing elements from a first digital component of the two-dimensional detection vector of a first sensing element among the plurality of sensing elements to generate a first component difference. The second subtraction circuit is configured to subtract a second digital component of the two-dimensional detection vector of the second sensing element from a second digital component of the two-dimensional detection vector of the first sensing element to generate a second component difference.

The present disclosure further provides an operating method of a capacitive touch system. The capacitive touch system includes a capacitive sensing matrix which has a plurality of drive electrodes and a plurality of receiving electrodes. The operating method includes the steps of: concurrently inputting encoded and modulated drive signals to the drive electrodes in each drive time slot of a plurality of drive time slots of a frame period of the capacitive sensing matrix; sequentially detecting the receiving electrodes of the capacitive sensing matrix within the frame period to respectively generate a detection matrix corresponding to each of the receiving electrodes; decoding the detection matrices to generate a plurality of two-dimensional detection vectors corresponding to each of the receiving electrodes, wherein each of the two-dimensional detection vectors includes a first digital component and a second digital component; sequentially performing a subtraction between first digital components of the two-dimensional detection vectors of two receiving electrodes among the plurality of receiving electrodes to generate first component differences; and sequentially performing a subtraction between second digital components of the two-dimensional detection vectors of two receiving electrodes among the plurality of receiving electrodes to generate second component differences.

The present disclosure further provides a capacitive touch system including a capacitive sensing matrix, a drive end, a detection circuit, at least one decoding module, a first subtraction circuit and a second subtraction circuit. The capacitive sensing matrix includes a plurality of drive electrodes and a plurality of receiving electrodes. The drive end is configured to concurrently input encoded and modulated drive signals to the drive electrodes in each drive time slot of a plurality of drive time slots of a frame period of the capacitive sensing matrix. The detection circuit is configured to sequentially couple to a first receiving electrode and a second receiving electrode among the plurality of receiving electrodes within the frame period, generate a first detection matrix corresponding to the first receiving electrode and generate a second detection matrix corresponding to the second receiving electrode. The at least one decoding module is configured to decode the first decoding matrix and the second decoding matrix to generate a plurality of first detection vectors corresponding to the first receiving electrode and generate a plurality of second detection vectors corresponding to the second receiving electrode. The first subtraction circuit is configured to perform a subtraction between first digital components of the first detection vectors and the second detection vectors to generate a first component difference. The second subtraction circuit is configured to perform a subtraction between second digital components of the first detection vectors and the second detection vectors to generate a second component difference.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1A:
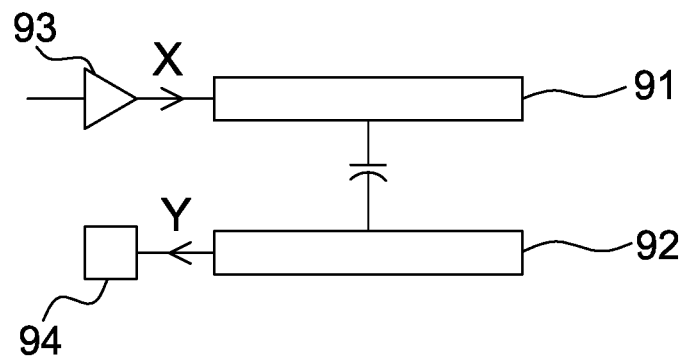
FIGS. 1A-1B are schematic diagrams of a conventional capacitive sensor.
Figure 1B:
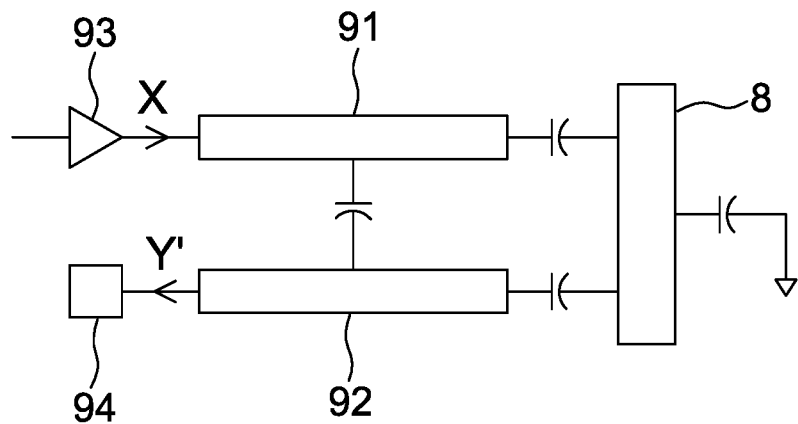
Figure 2:
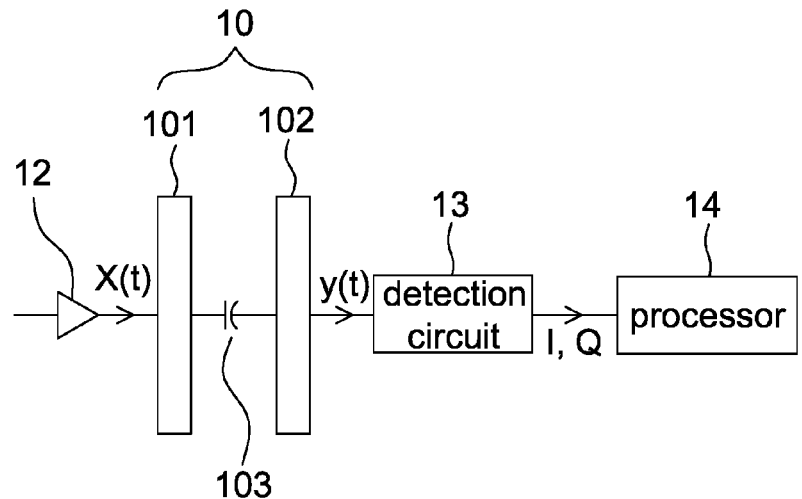
FIG. 2 is a schematic block diagram of a capacitive touch sensing device according to an embodiment of the present disclosure.

Referring to FIG. 2, it is a schematic block diagram of a capacitive touch sensing device according to an embodiment of the present disclosure. The capacitive touch sensing device of this embodiment includes a sensing element 10, a drive circuit 12, a detection circuit 13 and a processor 14. The capacitive touch sensing device is configured to detect whether an object (e.g. a finger, water drop or metal plate, but not limited to) approaches the sensing element 10 according to a change of the amount of charges on the sensing element 10. Ways to detect whether the object approaches the sensing element 10 are well known and not limited to the above method.

The sensing element 10 includes a first electrode 101 (e.g. a drive electrode) and a second electrode 102 (e.g. a receiving electrode), and an electric field can be produced to form a coupling capacitance 103 between the first electrode 101 and the second electrode 102 when a voltage signal is provided to the first electrode 101. The first electrode 101 and the second electrode 102 are arranged properly without particular limitations as long as the coupling capacitance 103 is formed (e.g. via a dielectric layer therebetween), wherein principles of forming the electric field and the coupling capacitance 103 between the first electrode 101 and the second electrode 102 are well known and thus are not described herein.

The drive circuit 12 is, for example, a signal generator and configured to provide a drive signal X(t) to the first electrode 101 of the sensing element 10. The drive signal X(t) is, for example, a time-varying signal such as a periodic signal. In other embodiments, the drive signal X(t) is, for example, a pulse signal such as a square wave or a triangle wave, but not limited thereto. The drive signal X(t) couples a detection signal y(t) on the second electrode 102 of the sensing element 10 through the coupling capacitance 103.

The detection circuit 13 is coupled to the second electrode 102 of the sensing element 10 and configured to receive the detection signal y(t). The detection circuit 13 modulates (or mixes) the detection signal y(t) respectively with two mixing signals so as to generate a pair of modulated detection signals I and Q, which are configured as two components of a two-dimensional detection vector (I,Q). The two mixing signals are, for example, continuous signals or vectors that are orthogonal or non-orthogonal to each other. In one aspect, the two mixing signals include a sine signal and a cosine signal.

The processor 14 is configured to calculate a scale of the pair of modulated detection signals, which is served as a norm of vector of the two-dimensional detection vector (I,Q), and compare the norm of vector with a threshold TH so as to identify a touch event. In one aspect, the processor 14 calculates the norm of vector $R=\sqrt{I^2+Q^2}$ by software. In other aspect, the processor 14 calculates the norm of vector by hardware or firmware, such as using a CORDIC (coordinate rotation digital computer) shown in FIG. 4 to calculate the norm of vector $R=\sqrt{I^2+Q^2}$, wherein the CORDIC is a fast algorithm. The processor 14 is, for example, a microprocessor (MCU), a central processing unit (CPU) or an application specific integrated circuit (ASIC).

Figure 4:
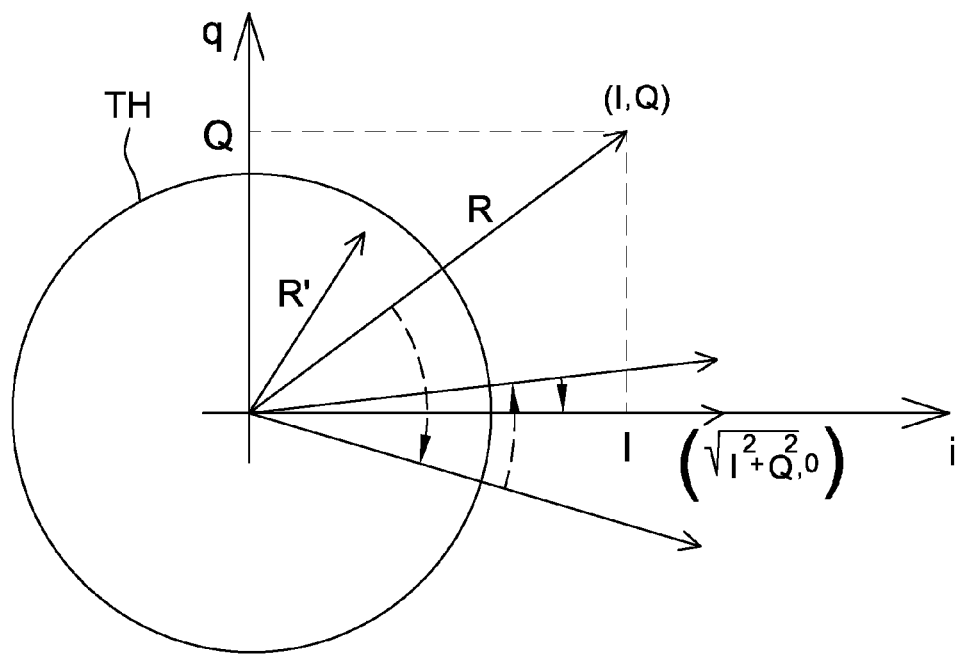
FIG. 4 is a schematic diagram of a norm of vector and a threshold according to an embodiment of the present disclosure.

In FIG. 4, when there is no object closing to the sensing element 10, the norm of vector calculated by the processor 14 is assumed to be R; and when an object is present nearby the sensing element 10, the norm of vector is decreased to R'. If the norm of vector R' is smaller than a threshold TH, the processor 14 identifies that the object is present close to the sensing element 10 to induce a touch event. It should be mentioned that when another object, such as a metal plate, approaches the sensing element 10, the norm of vector R can be increased. Therefore, it is possible for the processor 14 to identify a touch event when the norm of vector exceeds another predetermined threshold. In some embodiments, the processor 14 is able to compare a variation of the norm of vector with a variation threshold to accordingly identify a touch event.

Figure 3A:
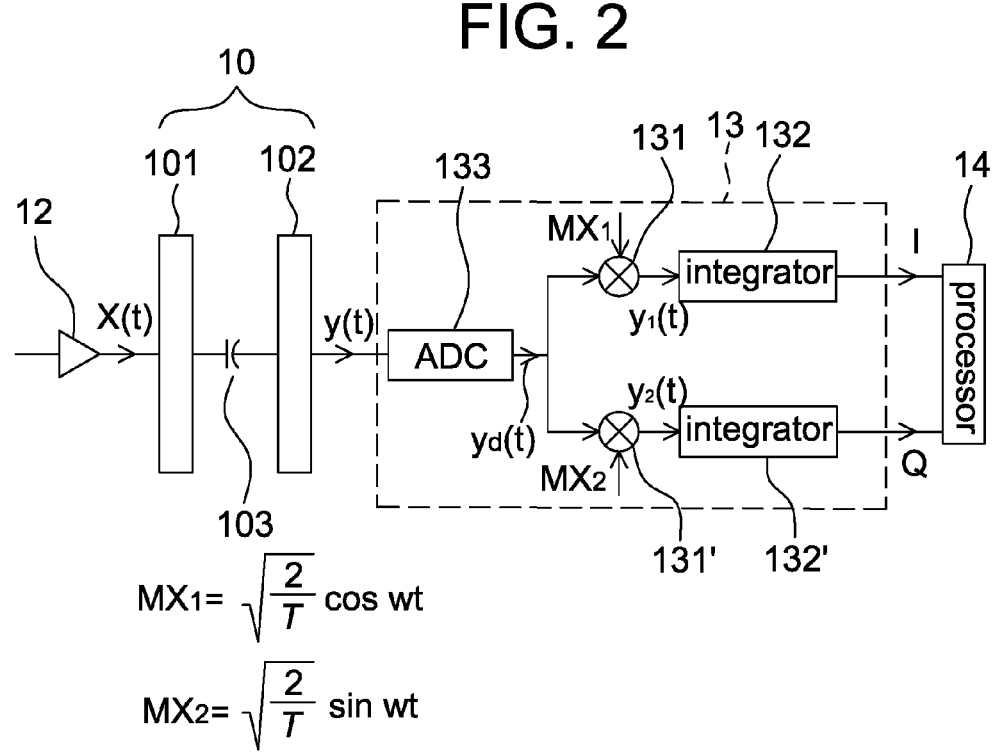
FIGS. 3A-3B are schematic block diagrams of a capacitive touch sensing device according to some embodiments of the present disclosure.
Figure 3B:
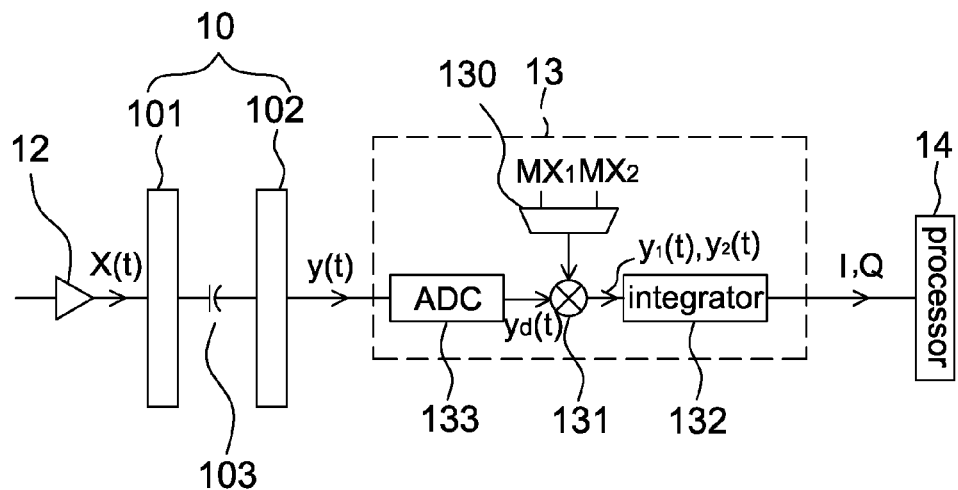

FIGS. 3A and 3B are schematic diagrams of the capacitive touch sensing device according to some embodiments of the present disclosure in which different implementations of a detection circuit 13 are shown.

In FIG. 3A, the detection circuit 13 includes an analog-to-digital converter (ADC) 133, two mixers 131 and 131', two integrators 132 and 132', and is configured to process a detection signal y(t) to generate a two-dimensional detection vector (I,Q). The ADC 133 is configured to convert the detection signal y(t) to a digital detection signal $y_d(t)$. The two mixers 131 and 131' are configured to modulate (or mix) the digital detection signal $y_d(t)$ with two mixing signals, such as $MX_1=\sqrt{2/T}\cos(\omega t)$ and $MX_2=\sqrt{2/T}\sin(\omega t)$ herein, so as to generate a pair of modulated detection signals $y_1(t)$ and $y_2(t)$. In order to sample the pair of modulated detection signals $y_1(t)$ and $y_2(t)$, two integrators 132 and 132' are employed to respectively integrate (or accumulate) the pair of modulated detection signals $y_1(t)$ and $y_2(t)$ to generate two digital components I, Q of a two-dimensional detection vector. In this embodiment, the two integrators 132 and 132' are any proper integration circuits, such as capacitors, without particular limitations. In addition to the two continuous signals mentioned above, the two mixing signals are selected as two vectors, for example $MX_1=[1\ 0\ -1\ 0]$ and $MX_2=[0\ -1\ 0\ 1]$, so as to simplify the circuit structure. The two mixing signals are selected from simplified vectors without particular limitations as long as the process of modulation is simplified. As the two digital components I and Q are accumulated values of the pair of modulated detection signals $y_1(t)$ and $y_2(t)$, in the present disclosure the pair of modulated detection signals $y_1(t)$ and $y_2(t)$ are also referred to two digital components of the two-dimensional detection vector.

In FIG. 3B, the detection circuit 13 includes an analog-to-digital converter (ADC) 133, a mixer 131 and an integrator 132, and the two mixing signals $MX_1$ and $MX_2$ are inputted to the mixer 131 via a multiplexer 130 to be modulated with the digital detection signal $y_d(t)$ so as to generate two modulated detection signals $y_1(t)$ and $y_2(t)$. In addition, functions of the ADC 133, the mixer 131 and the integrator 132 are similar to those shown in FIG. 3A and thus details thereof are not repeated herein.

A detection method of the capacitive touch sensing device of the present disclosure includes the steps of: providing a drive signal to a first electrode of a sensing element; modulating a detection signal coupled to a second electrode from the drive signal through a coupling capacitance respectively with two mixing signals so as to generate a pair of modulated detection signals; and calculating a scale of the pair of modulated detection signals to accordingly identify a touch event.

Referring to FIG. 3A or 3B for example, after the drive circuit 12 provides a drive signal X(t) to the first electrode 101 of the sensing element 10, the drive signal X(t) couples a detection signal y(t) on the second electrode 102 of the sensing element 10 through the coupling capacitance 103. Next, the detection circuit 13 respectively modulates the detection signal y(t) with two mixing signals $MX_1$ and $MX_2$ to generate a pair of modulated detection signals $y_1(t)$ and $y_2(t)$. The processor 14 calculates a scale of the pair of modulated detection signals $y_1(t)$ and $y_2(t)$ to accordingly identify a touch event, wherein methods of calculating a scale of the pair of modulated detection signals $y_1(t)$ and $y_2(t)$ and comparing the scale of the pair of modulated detection signals $y_1(t)$ and $y_2(t)$ with at least one threshold may be referred to FIG. 4 and its corresponding descriptions. In addition, before the scale of the pair of modulated detection signals $y_1(t)$ and $y_2(t)$ is calculated, the integrator 132 and/or 132' is operable to accumulate the pair of modulated detection signals $y_1(t)$ and $y_2(t)$ to output two digital components I and Q of the two-dimensional detection vector (I,Q).

Figures 5, 6:
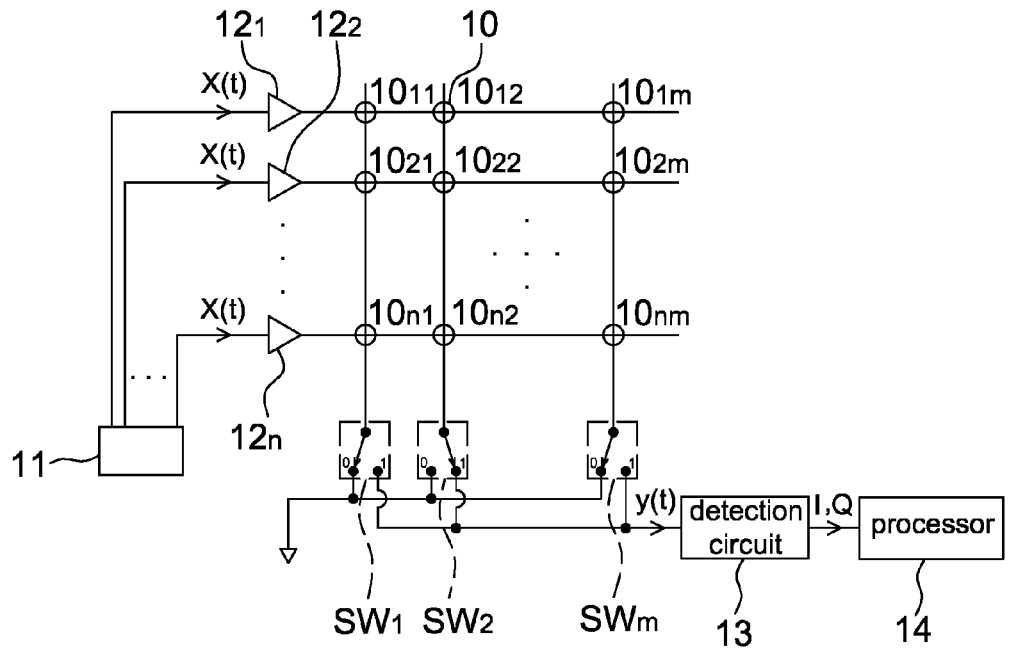
FIG. 5 is a schematic diagram of a capacitive touch system according to an embodiment of the present disclosure.
FIG. 6 is a schematic diagram of drive signals of every channel in every drive time slot of a concurrent driving capacitive touch system according to a first embodiment of the present disclosure.

Referring to FIG. 5, it is a schematic diagram of a capacitive touch system according to an embodiment of the present disclosure. A plurality of sensing elements 10 arranged in matrix forms a capacitive sensing matrix in which each row of the sensing elements 10 is respectively driven by one of the drive circuits $12_1$-$12_n$ and the detection circuit 13 detects output signals y(t) of every column of the sensing elements 10 through a plurality of switch devices $SW_1$-$SW_m$. As shown in FIG. 5, the drive circuit $12_1$ is configured to drive the first row of sensing elements $10_{11}$-$10_{1m}$; the drive circuit $12_2$ is configured to drive the second row of sensing elements $10_{21}$-$10_{2m}$; and the drive circuit $12_n$ is configured to drive the nth row of sensing elements $10_{n1}$-$10_{nm}$; wherein, n and m are positive integers and values thereof are determined according to the size and the resolution of the capacitive sensing matrix without particular limitations.

In this embodiment, each of the sensing elements 10 (shown by circles $10_{11}$ to $10_{nm}$ herein) includes a first electrode and a second electrode configured to form a coupling capacitance therebetween as shown in FIGS. 2, 3A and 3B. The drive circuits $12_1$-$12_n$ are respectively coupled to the first electrode of a row of the sensing elements 10. For example, a timing controller 11 is operable to control the drive circuits $12_1$-$12_n$ to respectively output a drive signal X(t) to the first electrode of the sensing elements 10. The drive circuits $12_1$-$12_n$ are configured to sequentially or concurrently drive the sensing elements $10_{11}$ to $10_{nm}$.

The detection circuit 13 is coupled to the second electrode of a column of the sensing elements 10 through a plurality of switch devices $SW_1$-$SW_m$ to sequentially detect a detection signal y(t) coupled to the second electrode from the drive signal X(t) through the coupling capacitance of the sensing elements 10. The detection circuit 13 respectively modulates the detection signal y(t) with two mixing signals to generate a pair of modulated detection signals, wherein details of generating the pair of modulated detection signals have been described in FIGS. 3A to 3B and corresponding descriptions and thus are not repeated herein.

The processor 14 identifies a touch event and a touch position according to the pair of modulated detection signals. As mentioned above, the processor 14 calculates a norm of vector of a two-dimensional detection vector (e.g. I and Q) formed by the pair of modulated detection signals and identifies the touch event by comparing the norm of vector with at least one threshold TH as FIG. 4.

In an embodiment of sequential driving, when the timing controller 11 controls the drive circuit $12_1$ to output the drive signal X(t) to the first row of sensing elements $10_{11}$-$10_{1m}$, the switch devices $SW_1$-$SW_m$ are sequentially conducted such that the detection circuit 13 detects the detection signal y(t) sequentially outputted by each sensing element of the first row of sensing elements $10_{11}$-$10_{1m}$. Next, the timing controller 11 sequentially controls other drive circuits $12_2$-$12n$ to output the drive signal X(t) to every row of the sensing elements. When the detection circuit 13 detects all of the sensing elements $10_{11}$ to $10_{nm}$, a scan period is accomplished. The processor 14 identifies a position of the sensing elements that the touch event occurs as the touch position. It is appreciated that said touch position may be occurred at more than one sensing elements 10 and the processor 14 takes all positions of a plurality of sensing elements 10 as touch positions or takes one of the positions (e.g. a center or gravity center) of a plurality of sensing elements 10 as the touch position.

In some embodiments, to save the power of the capacitive touch system in FIG. 5, the timing controller 11 controls at least a part of the drive circuits $12_1$-$12_n$ to concurrently output the drive signal X(t) to the corresponded sensing elements. The detection circuit 13 modulates the detection signal y(t) at each column with different two mixing signals $MX_1$ and $MX_2$, respectively. In addition, methods of identifying a touch event and a touch position are similar to FIG. 5, and thus details thereof are not repeated herein.

The detection circuit 13 may further include the filter and/or the amplifier to improve the signal quality. In addition, the processor 14 may be integrated with the detection circuit 13, and functions thereof are implemented by software and/or hardware.

As mentioned above, the phase shift during signal transmission caused by the capacitance on signal lines may be ignored by calculating the norm of vector of a two-dimensional detection vector. In other words, if a phase shift exists between drive signals X(t) of every channel, the phase shift may also be ignored by calculating the norm of vector of the two-dimensional detection vector. Therefore in an alternative embodiment of concurrent driving, it is able to concurrently drive different channels in the same drive time slot with a plurality of drive signals having phase shift from each other, and to identify a touch event and/or a touch position by calculating a norm of vector of two-dimensional detection vectors of every channel in the detection end. In addition, it is able to effectively use the dynamic range of ADC by phase-shifting drive signals X(t) of different channels, wherein the phase-shifting is implemented by a random phase offset or a formulated phase offset, but not limited thereto.

Figure 7:
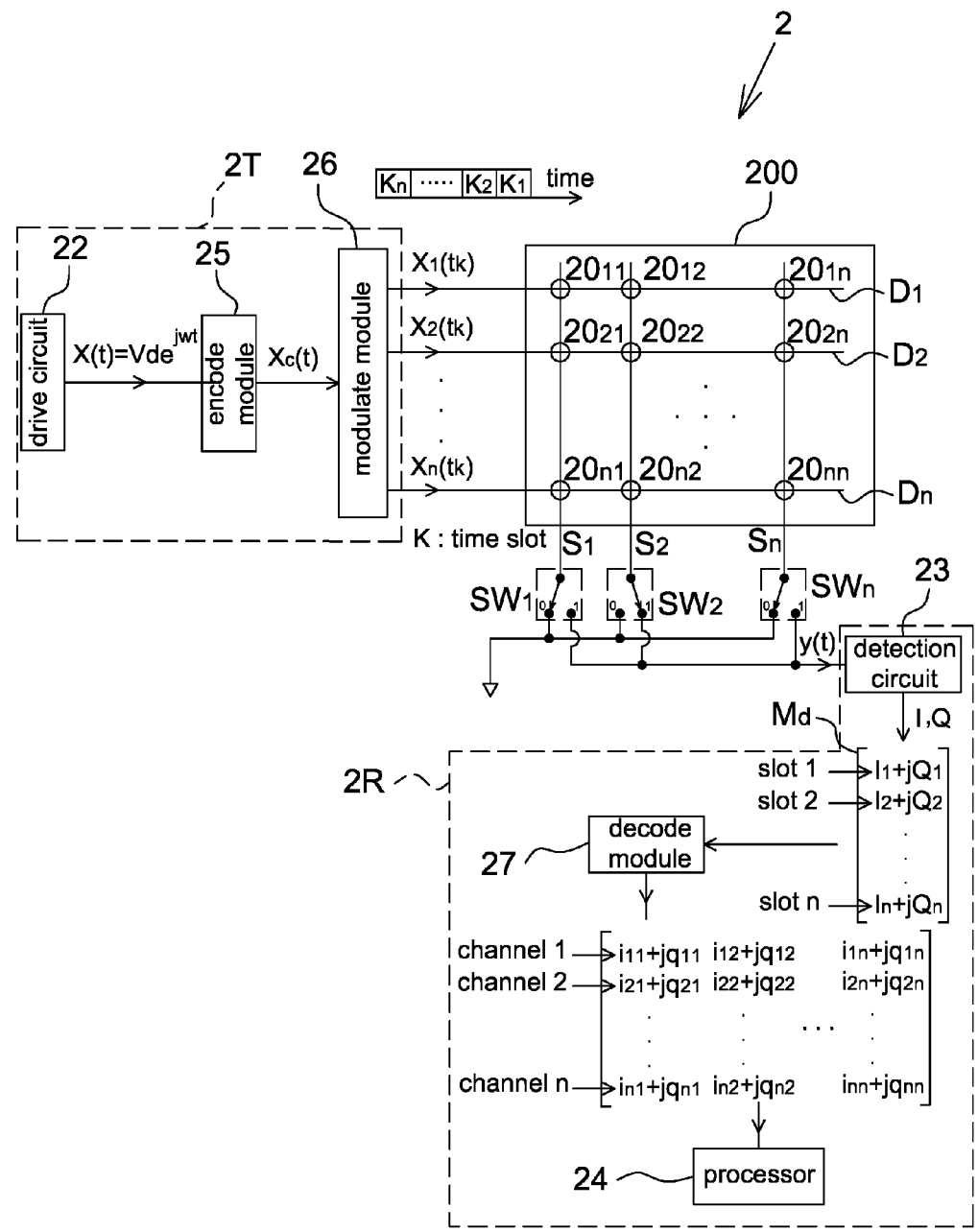
FIG. 7 is a schematic diagram of a concurrent driving capacitive touch system according to a first embodiment of the present disclosure.

Referring to FIG. 7, it is a schematic diagram of a concurrent driving capacitive touch system 2 according to a first embodiment of the present disclosure. The concurrent driving capacitive touch system 2 includes a drive end 2T, a capacitive sensing matrix 200 and a detection end 2R, wherein the capacitive sensing matrix 200 has a plurality of channels. For example, the capacitive sensing matrix 200 includes a plurality of sensing elements (e.g. $20_{11}$ to $20_{mn}$) arranged in rows and columns, and said channel herein is referred to sensing element rows driven by the drive end 2T.

The drive end 2T is configured to concurrently input encoded and modulated drive signals to a plurality of channels (or a plurality of drive electrodes $D_1$ to $D_n$) in each drive time slot of a plurality of drive time slots of a scan period (or a frame period) of the capacitive sensing matrix 200. The detection end 2R is sequentially coupled to the channels (or a plurality of receiving electrodes $S_1$ to $S_n$) of the capacitive sensing matrix 200 within the frame period, and configured to decode a plurality of detection matrices Md, which are obtained by detecting the channels, so as to generate a two-dimensional detection vectors corresponding to each of the channels and calculate a norm of vector of the two-dimensional detection vectors, wherein each matrix element of the detection matrices Md is a detection signal corresponding to one receiving electrode obtained in each of the drive time slots and the detection matrices Md are one-dimensional matrices. The method of generating the detection matrices Md is referred to FIGS. 3A and 3B. For example, the detection end 2R modulates a plurality of detection signals y(t) of the receiving electrodes $S_1$ to $S_n$ by two mixing signals $M_1$ and $M_2$ to respectively generate a pair of modulated detection signals $y_1(t)$ and $y_2(t)$, and accumulates the pair of modulated detection signals $y_1(t)$ and $y_2(t)$ by the integrator to generate the detection matrices Md.

In addition, the detection end 2R further compares the norm of vector with a threshold so as to identify a touch event and/or a touch position (as shown in FIG. 4). In one aspect, a number of the drive time slots is equal to a number of the channels (or the drive electrodes $D_1$ to $D_n$).

In this embodiment, the encoded and modulated drive signals is encoded by using a Hadamard matrix, i.e. the drive end 2T encoding a drive signal X(t) by a Hadamard matrix. The detection end 2R decodes the detection matrix Md using an inverse Hadamard matrix of the Hadamard matrix. The encoded and modulated drive signals may only be phase modulated or may be phase and amplitude modulated, e.g. using quadrature amplitude modulation (QAM).

In one embodiment, the concurrent driving capacitive touch system 2 includes a drive circuit 22, an encoding module 25, a modulation module 26, the capacitive sensing matrix 200, a detection circuit 23, a decoding module 27 and a processor 24. In one embodiment, the drive circuit 22, the encoding module 25 and the modulation module 26 may be combined to form the drive end 2T; and the detection circuit 23, the decoding module 27 and the processor 24 may be combined to form the detection end 2R. In some embodiments, the drive end 2T and the detection end 2R operate synchronously, but not limited thereto.

In another embodiment, the encoding module 25 and the modulation module 26 may be combined to form a single encoding and modulation module; and the decoding module 27 may be integrated with the processor 24 or the detection circuit 23.

The drive circuit 22 is to output a drive signal X(t) to the encoding module 25, e.g. X(t)=Vd×exp(jwt), wherein Vd indicates a drive voltage value, w indicates a drive frequency and t indicates time. As described in the previous embodiment, the drive signal X(t) is not limited to a continuous signal.

The encoding module 25 is configured to encode the drive signal X(t) corresponding to each row of the sensing elements (or each drive electrode $D_1$ to $D_n$) so as to output a plurality of encoded drive signals Xc(t). In one embodiment, the encoding module 25 encodes the drive signals X(t) using an encoding matrix, e.g. a Hadamard matrix. It is appreciated that as long as every channel is distinguishable by encoding, other encoding matrices may be used. In addition, a size of the encoding matrix is determined by a number of channels.

The modulation module 26 is configured to perform the phase modulation on the encoded drive signals Xc(t) corresponding to each row of the sensing elements (or each drive electrode $D_1$ to $D_n$) so as to concurrently output encoded and modulated drive signals to each row of the sensing elements (or each drive electrode $D_1$ to $D_n$) and said phase modulation is configured to allow the encoded and modulated drive signals inputted into each row of the sensing elements to have a phase shift from each other. In this manner, it is able to decrease the input voltage of the analog-to-digital (ADC) converter in the detection circuit 23 (as FIGS. 3A and 3B) so as not to exceed a dynamic range of the ADC converter. In other embodiments, the encoded drive signals Xc(t) may also be amplitude and phase modulated, e.g. using quadrature amplitude modulation. For example in FIG. 7, the modulation module 26 outputs an encoded and modulated drive signal $X_1(t_k)$ to a first channel, an encoded and modulated drive signal $X_2(t_k)$ to a second channel . . . and an encoded and modulated drive signal $X_n(t_k)$ to an nth channel, wherein k is referred to a drive time slot in a scan period herein.

For example, the encoding matrix may use equation (1) as an example and each matrix element is indicated by $a_{rs}$, wherein the subscript "r" of each matrix element $a_{rs}$ is associated with each drive time slot (e.g. $K_1$ to $K_n$) and the subscript "s" of each matrix element $a_{rs}$ is associated with each channel.

$$\begin{bmatrix} a_{11} & a_{12} & \cdots & a_{1n} \\ a_{21} & a_{22} & \cdots & a_{2n} \\ & & \ddots & \\ a_{n1} & a_{n2} & \cdots & a_{nn} \end{bmatrix} \quad (1)$$

The operation of the modulation module 26 may be represented mathematically by a diagonal matrix shown in equation (2), wherein $x_1$ to $x_n$ are complex numbers and preferably have a phase shift from each other. $x_1$ to $x_n$ are configured to perform the phase modulation on different channels respectively. When the quadrature amplitude modulation (QAM) is used as a modulation mechanism, $x_1$ to $x_n$ have an amplitude shift and a phase shift from each other, wherein the subscript of $x_1$ to $x_n$ is associated with each channel.

$$\begin{bmatrix} x_1 & 0 & \cdots & 0 \\ 0 & x_2 & \cdots & 0 \\ & & \ddots & \\ 0 & 0 & \cdots & x_n \end{bmatrix} \quad (2)$$

Referring to FIGS. 6 and 7, based on equations (1) and (2), the modulation module 26 concurrently outputs a drive signal $X(t)a_{11}x_1$ to the first channel (or the drive electrode $D_1$), a drive signal $X(t)a_{12}x_2$ to the second channel (or the drive electrode $D_2$) ... and a drive signal $X(t)a_{1n}x_n$ to the nth channel (or the drive electrode $D_n$) in the first time slot k=1. The modulation module 26 concurrently outputs a drive signal $X(t)a_{21}x_1$ to the first channel, a drive signal $X(t)a_{22}x_2$ to the second channel ... and a drive signal $X(t)a_{2n}x_n$ to the nth channel in the second time slot k=2. The modulation module 26 concurrently outputs a drive signal $X(t)a_{n1}x_1$ to the first channel, a drive signal $X(t)a_{n2}x_2$ to the second channel ... and a drive signal $X(t)a_{nn}x_n$ to the nth channel in the nth time slot k=n. After the encoded and modulated drive signals $X_1(t_k)$ to $X_n(t_k)$ of all time slots k=1 to k=n are inputted into the capacitive sensing matrix 200, the operation of one drive frame is accomplished. In this embodiment, the drive time slots $K_1$ to $K_n$ are continuous in time or separated by a predetermined time interval from one another.

As mentioned above, the capacitive sensing matrix 200 includes a first row of sensing elements $20_{11}$ to $20_{1n}$, a second row of sensing elements $20_{21}$ to $20_{2n}$, ... and a nth row of sensing elements $20_{n1}$ to $20_{nn}$ (i.e. channels 1 to n). The drive signals $X(t)a_{11}x_1$, $X(t)a_{12}x_2$, ... $X(t)a_{1n}x_n$ are respectively inputted into the first row of sensing elements $20_{11}$ to $20_{1n}$, the second row of sensing elements $20_{21}$ to $20_{2n}$, ... and the nth row of sensing elements $20_{n1}$ to $20_{nn}$ in the first time slot k=1. The drive signals inputted into each row of the sensing elements in other time slots k=2 to k=n are also shown in FIG. 6. In addition, signal lines of the capacitive sensing matrix 200 have different reactance with respect to different channels, and an one-dimensional matrix $[y_1\ y_2\ \ldots\ y_n]^T$ may be used to represent a reactance matrix of the capacitive sensing matrix 200 mathematically. In one scan period, if the capacitive sensing matrix 200 is not touched, the reactance matrix is substantially unchanged; whereas when a touch occurs, at least one matrix element of the reactance matrix is changed such that the detection signal y(t) is changed accordingly.

As shown in FIG. 7, each column of the sensing elements of the capacitive sensing matrix 200 is coupled to the detection circuit 23 via a respective switch device $SW_1$ to $SW_n$. Within each drive time slot $K_1$ to $K_n$ of one scan period, the switch devices $SW_1$ to $SW_n$ sequentially couple a corresponded column of the sensing elements to the detection circuit 23 to allow the detection circuit 23 to couple to the capacitive sensing matrix 200 and generate a detection matrix corresponding to each column of the sensing elements according to a detection signal y(t) of each column of the sensing elements. For example FIG. 7 shows that the switch device $SW_2$ couples the second column of the sensing elements of the capacitive sensing matrix 200 to the detection circuit 23 to generate a detection matrix Md corresponding to the second receiving electrode $S_2$.

The method of generating each matrix element $(I_1+jQ_1)$ to $(I_n+jQ_n)$ of the detection matrix Md is, for example, referred to FIGS. 3A and 3B. For example, the detection circuit 23 modulates the detection signal y(t) of each drive time slot $K_1$ to $K_n$ with two mixing signals $MX_1$ and $MX_2$ to respectively generate a pair of modulated detection signals $y_1(t)$ and $y_2(t)$, and accumulate the pair of modulated detection signals $y_1(t)$ and $y_2(t)$ corresponding to each drive time slot $K_1$ to $K_n$ by the integrator (e.g. 132, 132') to generate the detection matrix Md.

Therefore, after one scan period (i.e. one frame), the detection signal y(t) from every column of the sensing elements of the capacitive sensing matrix 200 may be represented by X(t)×[encoding matrix]×[modulation matrix]×[reactance matrix] as shown in equation (3) mathematically, wherein matrix elements of the encoding matrix are determined according to the encoding method being used; matrix elements of the modulation matrix are determined according to the modulation mechanism being used; and matrix elements of the reactance matrix are determined according to the capacitive sensing matrix 200. As mentioned above, the detection circuit 23 includes at least one integrator (as shown in FIGS. 3A and 3B) configured to obtain two digital components $(I_1,Q_1)$ to $(I_n,Q_n)$ of the two-dimensional detection vector (I+jQ) according to the detection signal y(t).

$$y(t) = x(t) \times \begin{bmatrix} a_{11} & a_{12} & \cdots & a_{1n} \\ a_{21} & a_{22} & \cdots & a_{2n} \\ & & \ddots & \\ a_{n1} & a_{n2} & \cdots & a_{nn} \end{bmatrix} \times \begin{bmatrix} x_1 & 0 & \cdots & 0 \\ 0 & x_2 & \cdots & 0 \\ & & \ddots & \\ 0 & 0 & \cdots & x_n \end{bmatrix} \times \begin{bmatrix} y_1 \\ y_2 \\ \vdots \\ y_n \end{bmatrix} \quad (3)$$

Therefore, two-dimensional detection vectors corresponding to each column of the sensing elements outputted by the detection circuit 23 after one scan period may be represented by a detection matrix Md=$[(I_1+jQ_1)\ (I_2+jQ_2)\ldots(I_n+jQ_n)]^T$, wherein $(I_1+jQ_1)$ is the two-dimensional detection vector obtained according to the detection signal y(t) of one column (e.g. the second column) of the sensing elements in the first drive time slot k=1. As the encoded and modulated drive signals $X_1(t_k)$ to $X_n(t_k)$ are respectively inputted into every channel in the first drive time slot k=1, the two-dimensional detection vector $(I_1+jQ_1)$ contains the superposition of detection signals of all channels in the first drive time slot k=1 and is a superposed detection vector. Similarly, $(I_2+jQ_2)$ is the two-dimensional detection vector obtained according to the detection signal y(t) of one column of the sensing elements in the second drive time slot k=2 and is a superposed detection vector of all channels in the second drive time slot k=2; ... ; $(I_n+jQ_n)$ is the two-dimensional detection vector obtained according to the detection signal y(t) of one column of the sensing elements in the nth drive time slot k=n and is a superposed detection vector of all channels in the nth drive time slot k=n.

For decoupling the superposed detection vectors of every channel, the detection circuit 23 sends the detection matrix Md to the decoding module 27 for decoding to generate a two-dimensional detection vector corresponding to every sensing element (e.g. $20_{11}$ to $20_{nn}$). For example, the decoding module 27 outputs two-dimensional detection vectors of every channel (i.e. the sensing element) in one column (e.g. the second column) of the sensing elements as shown by equation (4), wherein the two-dimensional detection vector corresponding to channel 1 of the second column of the sensing elements is represented by $(i_{12}+jq_{12})$, the two-dimensional detection vector corresponding to channel 2 of the second column of the sensing elements is represented by ($i_{22}+jq_{22}$), . . . and the two-dimensional detection vector corresponding to channel n of the second column of the sensing elements is represented by ($i_{n2}+jq_{n2}$), wherein i and q are two digital components of the two-dimensional detection vectors, and ($i_{12}+jq_{12}$) to ($i_{n2}+jq_{n2}$) are decoupled detection vectors. In FIG. 7, after one scan period, the decoding module 27 may output a set of two-dimensional detection vectors (i+jq) corresponding to every column of the sensing elements (or every receiving electrode); i.e. n sets of decoupled detection vectors [($i_1+jq_1$) ($i_2+jq_2$) . . . ($i_n+jq_n$)]$^T$. The decoding module 27 may use an inverse matrix of the encoding matrix to decouple the superposed detection vectors (i.e. the detection matrices) to decouple the superposed detection vectors, e.g. using an inverse matrix of the Hadamard matrix.

$$\begin{bmatrix} i_1 + jq_1 \\ i_2 + jq_2 \\ \vdots \\ i_n + jq_n \end{bmatrix} = \begin{bmatrix} I_1 + jQ_1 \\ I_2 + jQ_2 \\ \vdots \\ I_n + jQ_n \end{bmatrix} \begin{bmatrix} a_{11} & a_{12} & \cdots & a_{1n} \\ a_{21} & a_{22} & \cdots & a_{2n} \\ & & \ddots & \\ a_{n1} & a_{n2} & \cdots & a_{nn} \end{bmatrix}^T \quad (4)$$

Finally, the processor 24 calculates a norm of vector of each of the two-dimensional detection vectors, e.g. ($i_{11}+jq_{11}$) to ($i_{mn}+jq_{mn}$), and compares the obtained norm of vector with a threshold TH as shown in FIG. 4.

Accordingly, after one scan period, the processor 24 identifies a touch event and/or a touch position on the capacitive sensing matrix 200 according to a comparison result of comparing nxn norm of vectors with the threshold TH, wherein n is the size of the sensing matrix.

In addition, when the drive signal X(t) is also amplitude modulated in this embodiment, the processor 24 may further include an automatic level control (ALC) to eliminate the amplitude shift. For example, the control parameter of the ALC when the capacitive sensing matrix 200 is not touched is previously stored in the processor 24 (or an additional memory) to, for example, allow the detection results of every sensing element to be substantially identical. Accordingly, when a touch occurs, it is able to identify the touch event accurately.

In addition, as mentioned above, each of the sensing elements ($20_{11}$ to $20_{mn}$) includes a first electrode 101 and a second electrode 102 configured to form a coupling capacitance 103 (as shown in FIGS. 2, 3A and 3B). The encoded and modulated drive signals $X_1(t_k)$ to $X_n(t_k)$ are coupled to the first electrode 101. The detection circuit 23 is coupled to the second electrode 102 and configured to detect the detection signal y(t) coupled to the second electrode 102 from the encoded and modulated drive signals $X_1(t_k)$ to $X_n(t_k)$ through the coupling capacitance 103.

Figure 8:
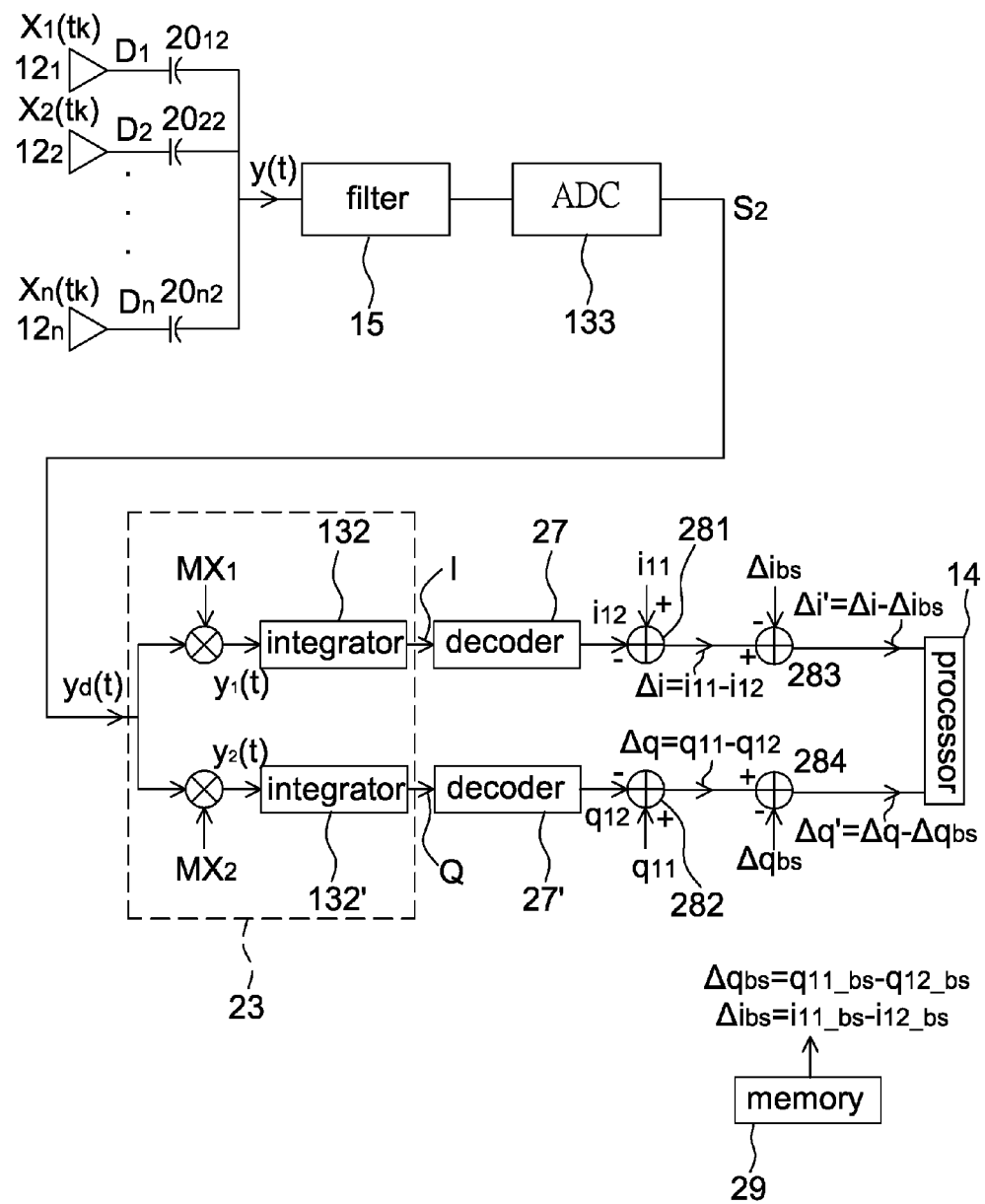
FIG. 8 is a schematic diagram of a capacitive touch system according to a second embodiment of the present disclosure.

Referring to FIG. 8, it is a schematic diagram of a capacitive touch system according to a second embodiment of the present disclosure. FIG. 8 corresponds to the concurrent driving capacitive touch system 2 of FIG. 7 in which the detection circuit 12 is electrically coupled to a receiving electrode $S_2$ via a switch device $SW_2$. That is, the capacitive touch system of FIG. 8 also includes a capacitive sensing matrix 200, a drive end 2T and a detection end 2R.

As shown in FIG. 7, the capacitive sensing matrix 200 includes a plurality of drive electrodes $D_1$-$D_n$ and a plurality of receiving electrodes $S_1$-$S_n$ to form a plurality of sensing elements $20_{11}$-$20_{mn}$ arranged in matrix. As FIG. 8 shows an operating state of the detection circuit 23 of the detection end 2R coupled to the receiving electrode $S_2$, only a second column of the sensing elements $20_{12}$-$20_{n2}$ are shown and other sensing elements are not shown.

As described in the previous embodiment, the drive end 2T is configured to concurrently output encoded and modulated drive signals $X_1(tk)$-$X_n(tk)$ to the drive electrodes $D_1$-$D_n$ within each drive time slot of a plurality of drive time slots (e.g. $K_1$-$K_n$) of a frame period of the capacitive sensing matrix 200 in operation. For example, it is shown herein that a plurality of drive circuits $12_1$-$12_n$ concurrently output a plurality of encoded and modulated drive signals $X_1(tk)$-$X_n(tk)$ to the drive electrodes $D_1$-$D_1$.

In FIG. 8, the detection end 2R includes a filter 15, an analog-to-digital (ADC) converter 133, a detection circuit 23, decoding modules (or decoders) 27 and 27', a plurality of subtraction circuits 218-248 and a processor 14, wherein although FIG. 8 shows two decoding modules 27 and 27', it is only intended to illustrate but not to limit the present disclosure. As shown in FIG. 7, the detection end 2R may include a single decoding module.

The filter 15 is, for example, a programmable bandpass filter and configured to filter the detection signal y(t) to improve the signal-to-noise ratio. The ADC 133 is coupled between the capacitive sensing matrix 200 and the detection circuit 23, and configured to convert the detection signal y(t) to a digital detection signal $y_d$(t). In the present disclosure, as the digital detection signal $t_d$(t) is a digitized signal of the detection signal y(t), the digital detection signal $t_d$(t) is referred to detection signal in some places herein.

Within the frame period, the detection circuit 23 is sequentially coupled to every receiving electrode $S_1$ to $S_n$ of the capacitive sensing matrix 200, e.g. a first receiving electrode $S_1$ and a second receiving electrode $S_2$, so as to generate a first detection matrix corresponding to the first receiving electrode $S_1$ and generate a second detection matrix corresponding to the second receiving electrode $S_2$, wherein the first receiving electrode $S_1$ is adjacent to the second receiving electrode $S_2$.

The decoding modules 27 and 27' decode the first detection matrix and the second detection matrix (e.g. Md) to generate a plurality of first detection vectors, e.g. ($i_{11}+iq_{11}$) to ($i_{n1}+jq_{n1}$), corresponding to the first receiving electrode and generate a plurality of second detection vectors, e.g. ($i_{12}+iq_{12}$) to ($i_{n2}+jq_{n2}$), corresponding to the second receiving electrode as shown in FIG. 7. It should be mentioned that the first and second receiving electrodes are not limited to $S_1$ and $S_2$. The first and second receiving electrodes are sequentially selected to be $S_1$ and $S_2$, $S_2$ and $S_3$, . . . , $S_{n-1}$ and $S_n$. The filter 15 and the ADC 133 of the second embodiment are also applicable to the concurrent driving capacitive touch system 2 of FIG. 7, and functions of the detection circuit 23 and the decoding modules 27 and 27' are similar to the detection circuit 23 and the decoding module 27 of FIG. 7, and thus details thereof are not repeated herein.

The difference between the second embodiment and the first embodiment is that the detection end 2R of the second embodiment further includes a first subtraction circuit 281 configured to perform a subtraction operation between a first digital component (e.g. $i_{11}$) of the first detection vectors (e.g. $i_{11}+jq_{11}$) and a first digital component (e.g. $i_{12}$) of the second detection vectors (e.g. $i_{12}+jq_{12}$) to generate a first component difference $\Delta$ i=$i_{11}$−$i_{12}$, and includes a second subtraction circuit 282 configured to perform a subtraction operation between a second digital component (e.g. $q_{11}$) of the first detection vectors and a second digital component (e.g. $q_{12}$) of the second detection vectors to generate a second component difference $\Delta$ q=$q_{11}$−$q_{12}$.

In this embodiment, the first digital component, e.g. $i_{11}$, is also referred to a first digital component of a two-dimensional detection vector associated with the sensing element $20_{11}$, the first digital component, e.g. $i_{12}$, is also referred to a first digital component of a two-dimensional detection vector associated with the sensing element $20_{12}$, the second digital component, e.g. $q_{11}$, is also referred to a second digital component of a two-dimensional detection vector associated with the sensing element $20_{11}$, and the second digital component, e.g. $q_{12}$, is also referred to a second digital component of a two-dimensional detection vector associated with the sensing element $20_{12}$, wherein the sensing element $20_{11}$ and the sensing element $20_{12}$ are two adjacent sensing elements in two adjacent columns of the sensing elements as shown in FIG. 7.

More specifically, in the present disclosure, the first subtraction circuit 281 and the second subtraction circuit 282 are configured to respectively calculate the subtraction operation between digital components of the detection vectors outputted by two adjacent receiving electrodes, e.g. sequentially calculating the subtraction operation between receiving electrodes $S_1$ and $S_2$, between receiving electrodes $S_2$ and $S_3$, ..., and between receiving electrodes $S_{n-1}$ and $S_n$. A reason to perform the subtraction is that the noise interference on two adjacent receiving electrodes in a capacitive sensing matrix is similar such that it is able to effectively eliminate external noise interference by the subtraction operation.

To improve the detection accuracy, in this embodiment the capacitive touch system further includes a memory element 29 configured to store a first base component difference $\Delta i_{bs}$ between a first base component (e.g. $\Delta i_{11\_bs}$) of the first detection vector (i.e. two-dimensional detection vector) and a second base component (e.g. $\Delta i_{12\_bs}$) of the second detection vector (i.e. two-dimensional detection vector), and store a second base component difference $\Delta q_{bs}$ between a second base component (e.g. $\Delta q_{11\_bs}$) of the first detection vector (i.e. two-dimensional detection vector) and a second base component (e.g. $\Delta q_{12\_bs}$) of the second detection vector (i.e. two-dimensional detection vector), wherein the first base component difference $\Delta i_{bs}$ and the second base component difference $\Delta q_{bs}$ are taken as ideal values for eliminating fixed noise in the signal and stored in the memory element 29 as a form of lookup table (as shown in Table 1). The memory element 29 is, for example, a volatile memory or buffer.

The detection end 2R further includes a third subtraction circuit 283 and a fourth subtraction circuit 284. The third subtraction circuit 283 is configured to subtract the first base component difference $\Delta i_{bs}$ from the first component difference $\Delta i$ to generate a third component difference $\Delta i'$. The fourth subtraction circuit 284 is configured to subtract the second base component difference $\Delta q_{bs}$ from the second component difference $\Delta q$ to generate a fourth component difference $\Delta q'$.

Finally, the processor 14 is configured to calculate a norm of vector $\sqrt{\Delta i'^2 + \Delta q'^2}$ of the third component difference $\Delta i'$ and the fourth component difference $\Delta q'$. The processor 14 compares the norm of vector $\sqrt{\Delta i'^2 + \Delta q'^2}$ with at least one threshold to identify a touch event, as shown in FIG. 4.

More specifically, in the second embodiment, the processor 14 does not directly calculate norm of vectors of the two-dimensional detection vectors $(i_{11} + jq_{11})$ to $(i_{nn} + jq_{nn})$ outputted by the decoding module 27. The processor 14 first performs the subtraction operation between digital components of the two-dimensional detection vectors associated with adjacent sensing elements and then calculates norm of vectors of the differential digital components.

Referring to Table 1, it is an example of the second embodiment of the present disclosure in which 6 receiving electrodes $S_1$-$S_6$ are taken as an example for illustration. It is appreciated that a number of the receiving electrodes and values provided in Table 1 are only intended to illustrate but not to limit the present disclosure. It should be mentioned that although Table 1 takes one row of the sensing elements as an example for illustration, the operation of other rows of the sensing elements are identical.

TABLE 1

| receiving electrode | $S_1$ | $S_2$ | $S_3$ | $S_4$ | $S_5$ | $S_6$ |
|---|---|---|---|---|---|---|
| $I_{nt}(n)$ | 5001 | 4800 | 4612 | 4588 | 4466 | 4300 |
| $Q_{nt}(n)$ | 8660 | 9898 | 11078 | 12163 | 13269 | 14370 |
| change ratio, R | 0.90 | 0.95 | 0.99 | 1.01 | 0.90 | 0.85 |
| $I_t(n)$ | 4501 | 4560 | 4566 | 4634 | 4019 | 3655 |
| $Q_t(n)$ | 7794 | 9403 | 10967 | 12285 | 11942 | 12215 |
| $\Delta i_{bs} = I_{nt}(n) - I_{nt}(n+1)$ | 201 | 188 | 24 | 122 | 166 | — |
| $\Delta q_{bs} = Q_{nt}(n) - Q_{nt}(n+1)$ | −1238 | −1180 | −1085 | −1106 | −1101 | — |
| $\Delta i = I_t(n) - I_t(n+1)$ | −59 | −6 | −68 | 615 | 364 | — |
| $\Delta q = Q_t(n) - Q_t(n+1)$ | −1609 | −1564 | −1318 | 343 | −273 | — |
| $\Delta i' = \Delta i - \Delta i_{bs}$ | −260 | −194 | −92 | 493 | 198 | — |
| $\Delta q' = \Delta q - \Delta q_{bs}$ | −371 | −384 | −233 | 1449 | 828 | — |
| Norm | 453 | 430 | 251 | −1531 | −851 | — |
| cumulative sum | −1248 | −1701 | −2131 | −2382 | −851 | 0 |
| adjusted Norm | 1134 | 681 | 251 | 0 | 1531 | 2382 |
| compensation factor | 26844 | 24403 | 22370 | 20649 | 19174 | 17896 |
| compensated Norm | 1858 | 1014 | 343 | 0 | 1792 | 2602 |

$I_{nt}(n)$ in the second row refers to initial values of first base components of the two-dimensional detection vectors of the sensing elements of every receiving electrode $S_1$ to $S_6$, e.g. $I_{nt}(1) = i_{16\_bs}$ to $I_{nt}(6) = i_{16\_bs}$, $I_{nt}(1) = i_{21\_bs}$ to $I_{nt}(6) = i_{26\_bs}$, ..., $I_{nt}(1) = i_{n1\_bs}$ to $I_{nt}(6) = i_{n6\_bs}$, when the capacitive sensing matrix is not touched. $I_{nt}(n)$ is detected in an initialization procedure such as a startup procedure or reset procedure.

$Q_{nt}(n)$ in the third row refers to initial values of second base components of the two-dimensional detection vectors of the sensing elements of every receiving electrode $S_1$ to $S_6$, e.g. $Q_{nt}(1) = q_{11\_bs}$ to $Q_{nt}(6) = q_{16\_bs}$, $Q_{nt}(1) = q_{21\_bs}$ to $Q_{nt}(1) = q_{26\_bs}$, ..., $Q_{nt}(1) = q_{n1\_bs}$ to $Q_{nt}(6) = q_{n6\_bs}$, when the capacitive sensing matrix is not touched. $Q_{nt}(n)$ is also detected in the initialization procedure.

The fourth row is a variation ratio R of the touched component with respect to the non-touch component of the two-dimensional detection vectors.

$I_t(n)$ in the fifth row refers to current values of first digital components of the two-dimensional detection vectors of the sensing elements of every receiving electrode $S_1$ to $S_6$, e.g. $I_t(1) = i_{11}$ to $I_t(6) = i_{16}$, $I_t(1) = i_{21}$ to $I_t(6) = i_{26}$, ..., $I_t(1) = i_{n1}$ to $I_t(6) = i_{n6}$, when the capacitive sensing matrix is touched. $I_{nt}(n)$ is detected during operation, and $I_t(n) = I_{nt}(n) \times R$.

$Q_t(n)$ in the sixth row refers to current values of second digital components of the two-dimensional detection vectors of the sensing elements of every receiving electrode $S_1$ to $S_6$, e.g. $Q_t(1) = q_{11}$ to $Q_t(6) = q_{16}$, $Q_t(1) = q_{21}$ to $Q_t(6) = q_{26}$, ..., $Q_t(1) = q_{n1}$ to $Q_t(6) = q_{n6}$, when the capacitive sensing matrix is touched. $Q_t(n)$ is detected during operation, and $Q_t(n) = Q_{nt}(n) \times R$.

Basically, $I_{nt}(n)$ and $I_t(n)$ as well as $Q_{nt}(n)$ and $Q_t(n)$ are detected in the same way only $I_{nt}(n)$ and $Q_{nt}(n)$ being detected in a non-touched condition whereas $I_t(n)$ and $Q_t(n)$ being detected in a touched condition. Therefore, $I_{nt}(n)$ and $Q_{nt}(n)$ are served as base values of $I_t(n)$ and $Q_t(n)$.

$\Delta i_{bs}$ in the seventh row refers to the first base component difference between first base components of the two-dimensional detection vectors of the sensing elements of two adjacent receiving electrodes when the capacitive sensing matrix is not touched, e.g. $i_{11\_bs}-i_{12\_bs}$, $i_{12\_bs}-i_{13\_bs}$, . . . , $i_{15\_bs}-i_{16\_bs}$, and other rows are similar. That is, $\Delta i_{bs}=I_{nt}(n)-I_{nt}(n+1)$ which is previously calculated by, for example, the first subtraction circuit 281 and stored in the memory element 29.

$\Delta q_{bs}$ in the eighth row refers to the second base component difference between second base components of the two-dimensional detection vectors of the sensing elements of two adjacent receiving electrodes when the capacitive sensing matrix is not touched, e.g. $q_{11\_bs}-q_{12\_bs}$, $q_{12\_bs}-q_{13\_bs}$, . . . , $q_{15\_bs}-q_{16\_bs}$, and other rows are similar. That is, $\Delta q_{bs}=Q_{nt}(n)-Q_{nt}(n+1)$ which is previously calculated by, for example, the second subtraction circuit 282 and stored in the memory element 29.

$\Delta i$ in the ninth row refers to the first component difference between first digital components of the two-dimensional detection vectors of the sensing elements of two adjacent receiving electrodes when the capacitive sensing matrix is touched, e.g. $i_{11}-i_{12}$, $i_{12}-i_{13}$, . . . , $i_{15}-i_{16}$, and other rows are similar. That is, $\Delta i=I_t(n)-I_t(n+1)$ which is a current component difference and calculated by, for example, the first subtraction circuit 281 during the system operation.

$\Delta q$ in the tenth row refers to the second component difference between second digital components of the two-dimensional detection vectors of the sensing elements of two adjacent receiving electrodes when the capacitive sensing matrix is touched, e.g. $q_{11}-q_{12}$, $q_{12}-q_{13}$, . . . , $q_{15}-q_{16}$, and other rows are similar. That is, $\Delta q=Q_t(n)-Q_t(n+1)$ which is a current component difference and calculated by, for example, the second subtraction circuit 282 during the system operation.

$\Delta i'$ in the eleventh row is obtained by a subtraction between the first component difference $\Delta i$ and the first base component difference $\Delta i_{bs}$, and calculated by, for example, the third subtraction circuit 283 during the system operation. This operation is to calculate a difference between the measurement value and the initial value. The first component difference $\Delta i$ is a current measurement value and the first base component difference $\Delta i_{bs}$ is temporarily stored in the memory element 29. It should be mentioned that although Table 1 shows that $\Delta i'=\Delta i-\Delta i_{bs}$, it is only intended to illustrate but not to limit the present disclosure. In another embodiment, $\Delta i'$ is calculated by $\Delta i-\Delta i_{bs}$. In this case, only the sign of $\Delta i'$ is reversed and the operation is similar.

$\Delta q'$ in the twelfth row is obtained by a subtraction between the second component difference $\Delta q$ and the second base component difference $\Delta q_{bs}$, and calculated by, for example, the fourth subtraction circuit 284 during the system operation. This operation is to calculate a difference between the measurement value and the initial value. The second component difference $\Delta q$ is a current measurement value and the second base component difference $\Delta q_{bs}$ is temporarily stored in the memory element 29. It should be mentioned that although Table 1 shows that $\Delta q'=\Delta q-\Delta q_{bs}$, it is only intended to illustrate but not to limit the present disclosure. In another embodiment, $\Delta q'$ is calculated by $\Delta q-\Delta q_{bs}$. In this case, only the sign of $\Delta q'$ is reversed and the operation is similar.

The thirteenth row is a norm of vector $\sqrt{\Delta i'^2+\Delta q'^2}$ of $\Delta i'$ and $\Delta q'$ and is calculated by the processor 14. A sign of the norm of vector is determined by two-dimensional vectors $(\Delta i_{bs}, \Delta q_{bs})$, $(\Delta i,\Delta q)$ and $(\Delta i',\Delta q')$. The method of determining a sign of a difference of two two-dimensional vectors $\vec{u}=(u1,u2)$ and $\vec{v}=(v1,v2)$ is defined as $\text{sign}(\vec{u}-\vec{v})\equiv \text{sign}(\vec{u}\times\vec{v})=\text{sign}((u2\times v1)-(u1\times v2))$. When a value of sign $((u2\times v1)-(u1\times v2))$ is larger than 0, the sign is positive; whereas when the value of $\text{sign}((u2\times v1)-(u1\times v2))$ is smaller than 0, the sign is negative. In this embodiment, the sign of the norm of vector is determined by $\text{sign}((Q_{nt}(n+1)\times I_{nt}(n))-(I_{nt}(n+1)\times Q_{nt}(n)))$ and $\text{sign}((\Delta q_{bs}\times\Delta i)-(\Delta q\times\Delta i_{bs}))$ together.

By using the differential sensing of this embodiment, a number of the norm of vectors is less than a number of the receiving electrodes by 1. Accordingly, it is preferably to adjust the norm of vectors in the thirteenth row to recover the number of the norm of vectors to be identical to that of the receiving electrodes. Firstly, a value associated with the last electrode (e.g. $S_6$) is set to 0 as in the fourteenth row. Then, start from the last value of the fourteenth row (i.e. 0), the value of the fourteenth row is added to a previous value in the thirteenth row to obtain a cumulative sum, i.e. $0+(-851)=-851$, $(-851)+(-1531)=-2382$, $(-2382)+251=-2131$, $(-2131)+430=-1701$ and $(-1701)+453=-1248$.

In an assumption that the variation caused by a touch is a positive value, and thus the norm of vectors should be larger than or equal to 0. In one embodiment, a smallest value of the cumulative sum in the fourteenth row is adjusted to 0, and other cumulative sums are adjusted together to obtain the adjusted norm of vectors in the fifth row. For example, herein each of the cumulative sums in the fourteenth row is added by 2382 to obtain the adjusted norm of vectors in the fifteenth row. It should be mentioned that the method of calculating the adjusted norm of vectors is not limited to that given herein. For example, it is also possible to set a value associated with the first electrode (e.g. $S_1$) to 0 and then calculate in an opposite direction without particular limitations as long as a number of the norm of vectors is recovered and values of the norm of vectors are larger than or equal to 0.

As mentioned above, as every sensing element of the capacitive sensing matrix can have different variations when being touched, if different thresholds (e.g. TH shown in FIG. 4) are set corresponding to different sensing elements, the processor 14 then directly compares the adjusted norm of vectors in the fifteenth row with the thresholds associated with every sensing element to identify sensing states of every sensing element.

In some embodiment, it is able to further compensate the adjusted norm of vectors in the fifteenth row corresponding to every sensing element such that the processor 14 may compare the compensated norm in the seventeenth row of vectors with a single threshold.

The sixteenth row provides a compensation factor $2^{28}/\overline{I_{nt}(n)^2+Q_{nt}(n)^2}$. The compensated norm of vectors in the seventeenth row is arranged as (adjusted norm of vectors× compensation factor)/$2^{14}$. It is appreciated that the method of compensating the adjusted norm of vectors is not limited to that given herein.

Finally, the processor 14 compares the compensated norm of vectors with at least one predetermined threshold to identify a touch event and a touch position. In this embodiment, the operations from the thirteenth to the seventeenth rows are performed by the processor 14 and implemented by software and/or hardware.

Figure 9:
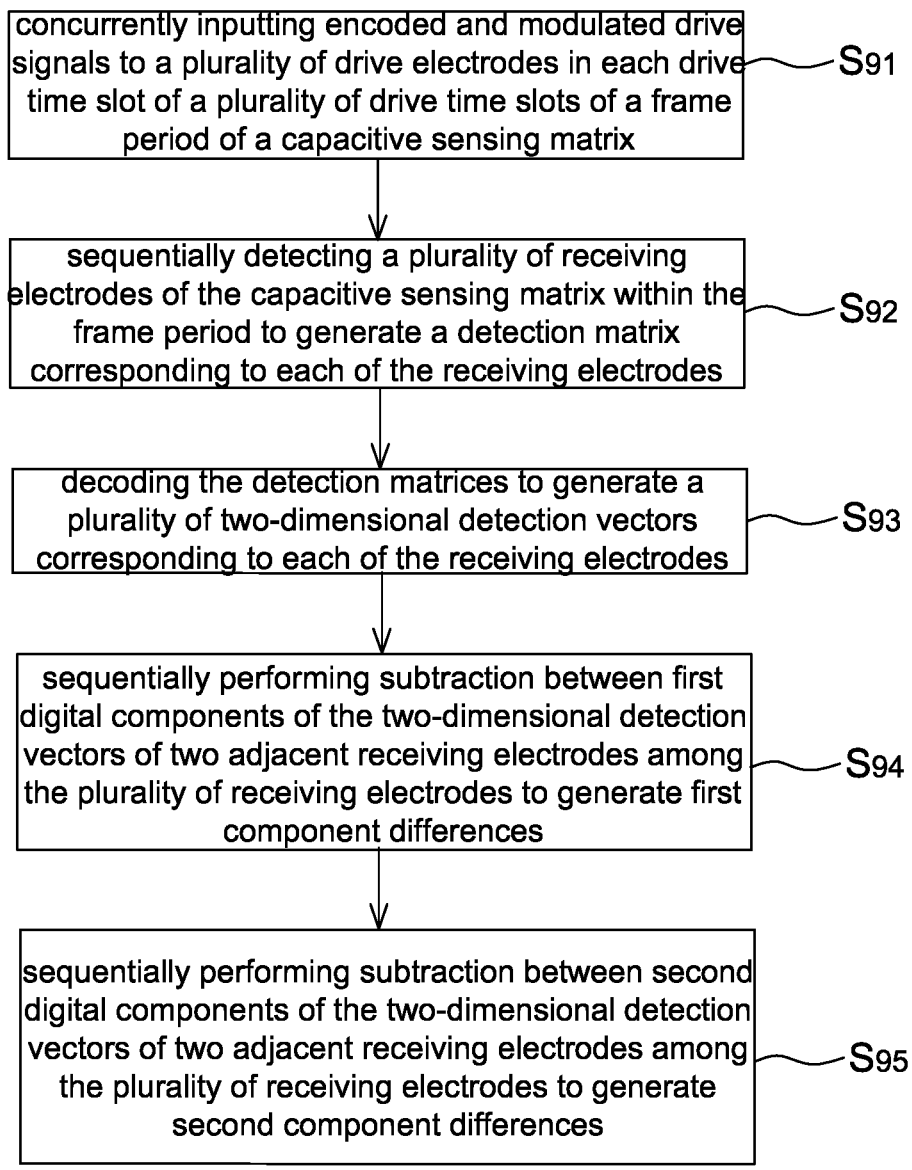
FIG. 9 is a flow chart of an operating method of a capacitive touch system according to a second embodiment of the present disclosure.

Referring to FIG. 9, it is a flow chart of an operating method a capacitive touch system according to a second embodiment of the present disclosure, which includes the steps of: concurrently inputting encoded and modulated drive signals to a plurality of drive electrodes in each drive time slot of a plurality of drive time slots of a frame period of a capacitive sensing matrix (Step S91); sequentially detecting a plurality of receiving electrodes of the capacitive sensing matrix within the frame period to respectively generate a detection matrix corresponding to each of the receiving electrodes (Step S92); decoding the detection matrices to generate a plurality of two-dimensional detection vectors corresponding to each of the receiving electrodes, wherein each of the two-dimensional detection vectors has a first digital component and a second digital component (Step S93); sequentially performing a subtraction between the first digital components of the two-dimensional detection vectors of two adjacent receiving electrodes among the plurality of receiving electrodes to generate first component differences (Step S94); and sequentially performing a subtraction between the second digital components of the two-dimensional detection vectors of two adjacent receiving electrodes among the plurality of receiving electrodes to generate second component differences (Step S95). Details of this operating method have been illustrated above. For example, the step S91 is performed by the drive end 2T, and the steps S92-S95 are performed by the detection end 2R.

For example in the steps S94 and S95, the first subtraction circuit 281 sequentially calculates $(i_{11}-i_{12})$, $(i_{12}-i_{13})$, $(i_{13}-i_{14})$ . . . to obtain first component differences $\Delta i$; and the second subtraction circuit 282 sequentially calculates $(q_{11}-q_{12})$, $(q_{12}-q_{13})$, $(q_{13}-q_{14})$ . . . to obtain second component differences $\Delta b$ as shown in Table 1 to accordingly implement the step of sequentially performing a subtraction between digital components of the two-dimensional detection vectors of two adjacent receiving electrodes among the plurality of receiving electrodes.

In the step S92, as shown in FIGS. 7 and 8, the detection matrix Md is generated by providing two mixing signals $MX_1$ and $MX_2$ to modulate a plurality of detection signals y(t) of the receiving electrodes $S_1$ to $S_n$ to respectively generate a pair of modulated detection signals $y_1(t)$ and $y_2(t)$ corresponding to every drive time slot $K_1$ to $K_n$, and by accumulating the pair of modulated detection signals $y_1(t)$ and $y_2(t)$ corresponding to every drive time slot $K_1$ to $K_n$ with the integrators 132 and 132'.

The memory element 29 sequentially stores (e.g. in the initialization procedure) first base component difference $\Delta i_{bs}$ of first base components of the two-dimensional detection vectors of two adjacent receiving electrodes among the receiving electrodes $S_1$ to $S_n$, and stores second base component difference $\Delta q_{bs}$ of second base components of the two-dimensional detection vectors of two adjacent receiving electrodes among the receiving electrodes $S_1$ to $S_n$ as shown in Table 1.

The third subtraction circuit 283 then calculates a third component difference $\Delta i'$ by subtracting the first base component difference $\Delta i_{bs}$ from the first component difference $\Delta i$. The fourth subtraction circuit 284 then calculates a fourth component difference $\Delta q'$ by subtracting the second base component difference $\Delta q_{bs}$ from the second component difference $\Delta q$.

Finally, the processor 29 calculates a norm of vector $\overrightarrow{\Delta i'^2 + \Delta q'^2}$ of the third component difference $\Delta i'$ and the fourth component difference $\Delta q'$ to obtain one norm of vector component corresponding to each sensing element, i.e. total n×n norm of vectors. The processor 29 then compares the norm of vectors with at least one threshold (as shown in FIG. 4) to identify a touch event. As mentioned above, the norm of vectors may or may not be compensated according to different applications.

Although the above embodiments are illustrated by taking mutual capacitance system as an example, the present disclosure is not limited thereto. More specifically, when the encoded and modulated drive signals $X_1(tk)$ to $X_n(tk)$ are inputted into the drive electrodes $D_1$ to $D_n$ and the capacitive touch system is configured as a mutual capacitance system, the first receiving electrode and the second receiving electrode are two of the receiving electrodes $S_1$ to $S_n$. When the encoded and modulated drive signals $X_1(tk)$ to $X_n(tk)$ are inputted into the drive electrodes $D_1$ to $D_n$ and the capacitive touch system is configured as a self capacitance system, the first receiving electrode and the second receiving electrode are two of the drive electrodes $D_1$ to $D_n$.

It should be mentioned that although two adjacent sensing elements of two adjacent columns of sensing elements (or two adjacent receiving electrodes) are taken as an example herein, it is only intended to illustrate but not to limit the present disclosure. In other embodiments, said two sensing elements (or two receiving electrodes) are not adjacent to each other and separated by at least one other sensing element (or other receiving electrode).

As mentioned above, when capacitive sensors are applied to different electronic devices, they are interfered by the noise of the electronic devices to degrade the detection accuracy. Therefore, the present disclosure further provides a capacitive touch system (FIGS. 7-8) and an operating method thereof (FIG. 9) that perform the subtraction between digital components of the detection matrix generated by adjacent receiving electrodes to eliminate interference from noises and improve the detection accuracy.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:
1. A capacitive touch system comprising:
  a drive circuit configured to output a drive signal;
  a capacitive sensing matrix comprising a plurality of sensing elements arranged in rows and columns;
  an encoding module configured to encode the drive signal corresponding to each row of the sensing elements to output encoded drive signals;
  a modulation module configured to modulate the encoded drive signals corresponding to each row of the sensing elements to concurrently output encoded and modulated drive signals to each row of the sensing elements;
  a detection circuit coupled to the capacitive sensing matrix and configured to respectively generate a detection matrix according to a detection signal of each column of the sensing elements;
  a decoding module configured to decode the detection matrices to output a two-dimensional detection vector corresponding to each of the sensing elements;
  a first subtraction circuit configured to subtract a first digital component of the two-dimensional detection vector of a second sensing element among the plurality of sensing elements from a first digital component of the two-dimensional detection vector of a first sensing element among the plurality of sensing elements to generate a first component difference; and a second subtraction circuit configured to subtract a second digital component of the two-dimensional detection vector of the second sensing element from a second digital component of the two-dimensional detection vector of the first sensing element to generate a second component difference.

2. The capacitive touch system as claimed in claim 1, wherein the detection circuit is configured to
modulate the detection signal with two mixing signals to generate a pair of modulated detection signals; and
accumulate the pair of modulated detection signals to generate the detection matrix.

3. The capacitive touch system as claimed in claim 1, further comprising a memory element configured to, when the capacitive sensing matrix is not touched,
store a first base component difference between a first base component of the two-dimensional detection vector of the first sensing element and a first base component of the two-dimensional detection vector of the second sensing element, and
store a second base component difference between a second base component of the two-dimensional detection vector of the first sensing element and a second base component of the two-dimensional detection vector of the second sensing element.

4. The capacitive touch system as claimed in claim 3, further comprising a third subtraction circuit, a fourth subtraction circuit and a processor, wherein
the third subtraction circuit is configured to subtract the first base component difference from the first component difference to generate a third component difference,
the fourth subtraction circuit is configured to subtract the second base component difference from the second component difference to generate a fourth component difference, and
the processor is configured to calculate a norm of vector of the third component difference and the fourth component difference.

5. The capacitive touch system as claimed in claim 4, wherein the first sensing element and the second sensing element are two adjacent sensing elements of two adjacent columns of the sensing elements.

6. The capacitive touch system as claimed in claim 1, wherein the encoding module is configured to encode the drive signal with a Hadamard matrix, and the decoding module is configured to decode the detection matrices with an inverse matrix of the Hadamard matrix.

7. The capacitive touch system as claimed in claim 1, further comprising an analog to digital converter coupled between the capacitive sensing matrix and the detection circuit, and configured to convert the detection signal to a digital detection signal.

8. An operating method of a capacitive touch system, the capacitive touch system comprising a capacitive sensing matrix which comprises a plurality of drive electrodes and a plurality of receiving electrodes, the operating method comprising:
concurrently inputting encoded and modulated drive signals to the drive electrodes in each drive time slot of a plurality of drive time slots of a frame period of the capacitive sensing matrix;
sequentially detecting the receiving electrodes of the capacitive sensing matrix within the frame period to respectively generate a detection matrix corresponding to each of the receiving electrodes;
decoding the detection matrices to generate a plurality of two-dimensional detection vectors corresponding to each of the receiving electrodes, wherein each of the two-dimensional detection vectors includes a first digital component and a second digital component;
sequentially performing a subtraction between first digital components of the two-dimensional detection vectors of two receiving electrodes among the plurality of receiving electrodes to generate first component differences; and
sequentially performing a subtraction between second digital components of the two-dimensional detection vectors of two receiving electrodes among the plurality of receiving electrodes to generate second component differences.

9. The operating method as claimed in claim 8, further comprising:
modulating a plurality of detection signals generated by detecting the receiving electrodes to respectively generate a pair of modulated detection signals; and
accumulating the pair of modulated detection signals to generate the detection matrices.

10. The operating method as claimed in claim 8, wherein when the capacitive sensing matrix is not touched, the operating method further comprises:
sequentially storing first base component differences between first base components of the two-dimensional detection vectors of two receiving electrodes among the plurality of receiving electrodes; and
sequentially storing second base component differences between second base components of the two-dimensional detection vectors of two receiving electrodes among the plurality of receiving electrodes.

11. The operating method as claimed in claim 10, further comprising:
calculating a third component difference between the first component differences and the first base component differences; and
calculating a fourth component difference between the second component differences and the second base component differences.

12. The operating method as claimed in claim 11, further comprising:
calculating a norm of vector of the third component difference and the fourth component difference.

13. The operating method as claimed in claim 8, wherein the encoded and modulated drive signals are encoded by a Hadamard matrix, and the detection matrices are decoded by an inverse matrix of the Hadamard matrix.

14. A capacitive touch system comprising:
a capacitive sensing matrix comprising a plurality of drive electrodes and a plurality of receiving electrodes;
a drive end configured to concurrently input encoded and modulated drive signals to the drive electrodes in each drive time slot of a plurality of drive time slots of a frame period of the capacitive sensing matrix;
a detection circuit configured to sequentially couple to a first receiving electrode and a second receiving electrode among the plurality of receiving electrodes within the frame period, generate a first detection matrix corresponding to the first receiving electrode and generate a second detection matrix corresponding to the second receiving electrode;
at least one decoding module configured to decode the first decoding matrix and the second decoding matrix to generate a plurality of first detection vectors corresponding to the first receiving electrode and generate a plurality of second detection vectors corresponding to the second receiving electrode;

a first subtraction circuit configured to perform a subtraction between first digital components of the first detection vectors and the second detection vectors to generate a first component difference; and a second subtraction circuit configured to perform a subtraction between second digital components of the first detection vectors and the second detection vectors to generate a second component difference.

15. The capacitive touch system as claimed in claim 14, wherein the capacitive touch system is configured as a mutual capacitance system, and the first receiving electrode and the second receiving electrode are two adjacent receiving electrodes of the plurality of receiving electrodes.

16. The capacitive touch system as claimed in claim 14, wherein the capacitive touch system is configured as a self capacitance system, and the first receiving electrode and the second receiving electrode are two of the plurality of drive electrodes.

17. The capacitive touch system as claimed in claim 14, further comprising a memory element configured to, when the capacitive sensing matrix is not touched, store a first base component difference between first base components of the first detection vectors and the second detection vectors, and store a second base component difference between second base components of the first detection vectors and the second detection vectors.

18. The capacitive touch system as claimed in claim 17, further comprising a third subtraction circuit and a fourth subtraction circuit, wherein the third subtraction circuit is configured to subtract the first base component difference from the first component difference to generate a third component difference, and the fourth subtraction circuit is configured to subtract the second base component difference from the second component difference to generate a fourth component difference.

19. The capacitive touch system as claimed in claim 18, further comprising a processor configured to calculate a norm of vector of the third component difference and the fourth component difference.

20. The capacitive touch system as claimed in claim 14, wherein a number of the drive time slots is identical to a number of the drive electrodes.

* * * * *